Patented Sept. 9, 1952

2,610,121

UNITED STATES PATENT OFFICE

2,610,121
PHOTOGRAPHIC SILVER HALIDE EMULSIONS

Polydoor Frans De Smet, Wilrijk-Antwerp, and André Emile van Dormael, Heverlee-Louvain, Belgium, assignors to Gevaert Photo-Producten N. V., Mortsel-Antwerp, Belgium, a company of Belgium No Drawing. Application June 27, 1947, Serial No. 757,664. In Great Britain July 5, 1946

1 Claim. (Cl. 95—7)

The present invention relates to photographic silver halide emulsions.

It is already known to use as optical sensitizers in silver halide emulsions symmetrical 2,2'-carbocyanines prepared from a thiodiazol-1,3,4 nucleus containing in the 5 position a thio-ether group and corresponding to the following structure:

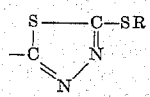

It is an object of the present invention to provide new photographic silver halide emulsions.

Further objects will appear from the following description.

These objects are accomplished by incorporating in a photographic silver halide emulsion an asymmetrical meso-substituted carbocyanine dyestuff, one of the nuclei of which is a 1,3,4-thiodiazole nucleus substituted in the 5 position with thio-ether.

Such dyestuffs may be represented by the following general formula:

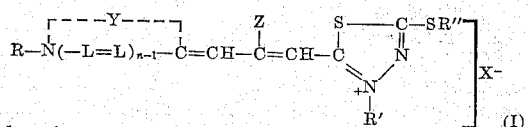

wherein
Y represents the non-metallic atoms necessary for completing a heterocyclic nucleus,
R and R' represent alkyl, aralkyl, alkylene, aryl,
R'' represents alkyl, aralkyl,
Z represents aryl, alkyl, or a thio-ether group,
X represents an acid residue,
L represents a methine group,
$n$ represents 1 or 2.

By appropriately selecting the group for Y, the absorption maximum of the asymmetrical dyestuff according to the above general formula may be adapted to the range of sensitization aimed at. Moreover, with most of the new sensitizers, a very favorable sensitization will be obtained.

The dyestuffs in accordance with our invention may be prepared by application of generally known methods.

One of the methods of preparing may be represented by the following scheme:

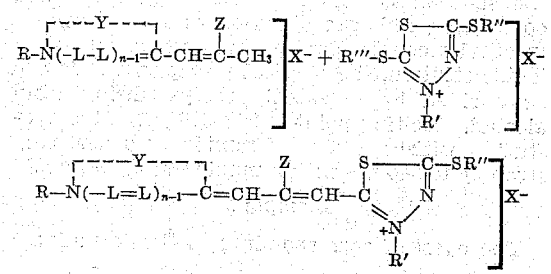

wherein R''' represents alkyl or substituted alkyl; the other symbols have the same significance as above.

Another method of preparing the new dyestuffs comprises the use of the intermediate products described in the pending U. S. patent application Ser. 713,454 of December 2, 1946, now Patent No. 2,468,577 of April 26, 1949, according to the following general formula:

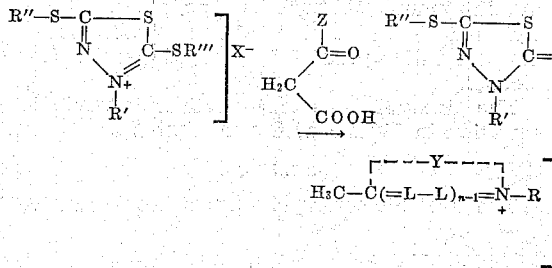

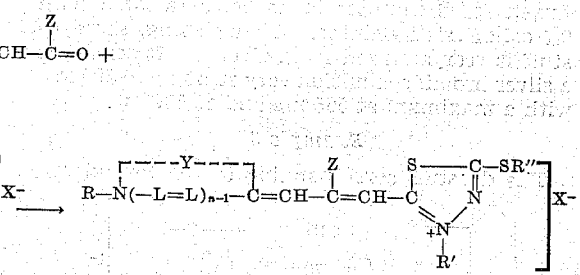

The preparation of the di-mercapto thiodiazol-1,3,4 of the formula:

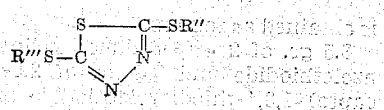

wherein R'' and R''' represent alkyl, substituted alkyl, may be carried out as described by Busch & Bichler in "J. Prakt. Chem." (2) 93 (1916) p. 356.

The sensitizers according to the general Formula I may be added to the silver halide emulsions either during their preparation of, alternatively, the finished emulsion layers may be sensitized by immersing them in a solution of the sensitizing dyestuff according to the said general Formula I.

Furthermore, we have found that the sensitizing dyestuffs of the general Formula I may be used together with other sensitizing dyestuffs.

It has also been found that in many cases, when used with known sensitizing dyestuffs or even with non-sensitizing compounds of the class known to affect the sensitizing properties of an emulsion, a "supersensitization" effect is obtained.

The following examples illustrate our invention, without limiting, however, its scope in any way.

*Example 1*

The dyestuff corresponding to the formula:

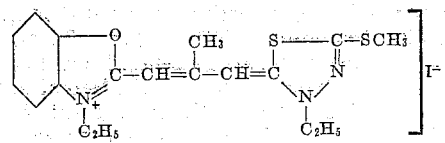

is obtained as follows:

3.4 gr. of 2-(β-β-dimethylvinyl)-benzoxazole-thiodide and 3.4 gr. of 2,5-di(methylmercapto)-1,3,4-thiodiazolethiodide are dissolved in 40 cc. of alcohol. 1.4 cc. of triethylamine are added, and the solution is boiled for two minutes. Upon cooling, crystals are obtained which are soluble in ethyl alcohol. By treating with a potassium iodide solution, the dyestuff precipitates. It can be purified by repeatedly recrystallizing from alcohol. Melting point is 209–210° C. This dyestuff sensitizes a silver bromide emulsion very strongly to 580 m$\mu$ with a maximum at 540 m$\mu$.

*Example 2*

The dyestuff corresponding to the formula:

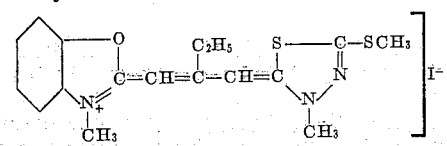

is obtained as follows:

1.7 gr. of 2-(β-ethyl-β-methylvinyl)-benzoxazolemethyl iodide and 1.65 gr. of 2,5-dimethylmercapto-1,3,4-thiodiazolemethyl iodide are refluxed for 2 minutes in 15 cc. of alcohol with 0.7 cc. of triethylamine. After cooling, the dyestuff is recrystallized from alcohol. It sensitizes a silver bromide emulsion very strongly to 590 m$\mu$, with a maximum at 565 m$\mu$ and at 580 m$\mu$.

*Example 3*

The dyestuff corresponding to the formula:

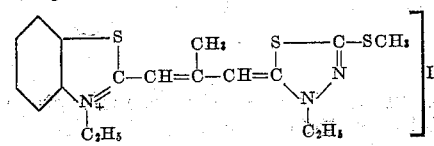

is obtained as follows:

3.5 gr. of 2-(β-β-dimethylvinyl)-benzothiazolethiodide and 3.4 gr. of 2,5-di(methylmercapto)-1,3,4-thiodiazolethiodide are dissolved in 40 cc. of alcohol. Next, 1.4 cc. of triethylamine are added, and the solution is boiled for 2 minutes. After addition of a potassium iodide solution, the dyestuff crystallizes out. It can be purified by repeatedly recrystallizing from ethyl alcohol. Melting point is 210–212° C.

This dyestuff very strongly sensitizes a silver bromide emulsion to 620 m$\mu$ with a maximum at 580 m$\mu$.

*Example 4*

The dyestuff of Example 1, mixed with N-N'-diethyl-quinopseudocyanine iodide, sensitizes very strongly a silver bromide emulsion to 595 m$\mu$ with a maximum at 570 m$\mu$.

*Example 5*

The dyestuff of Example 3, mixed with N-N'-diethyl benzthio quino-2,2'-cyanine iodide sensitizes a silver bromide emulsion to 630 m$\mu$ with a maximum at 530 and 585 m$\mu$.

*Example 6*

The dyestuff corresponding to the formula:

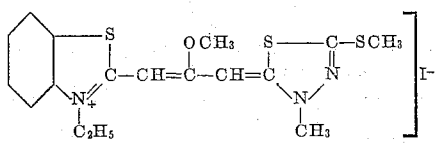

is obtained as follows:

3.5 gr. of 2-(β-methoxy-β-methylvinyl)-benzthiazolethylmethyl sulphate and 3.2 gr. of 2,5-dimethylmercapto-1,3,4-thiodiazolemethyl iodide are refluxed for 5 minutes in 40 cc. of alcohol with 1.4 cc. of triethylamine. After cooling, the obtained product is precipitated with ether and recrystallized from alcohol.

This dyestuff very strongly sensitizes a silver chloride emulsion to 568 m$\mu$ with a broad maximum at 520 m$\mu$.

*Example 7*

The dyestuff corresponding to the formula:

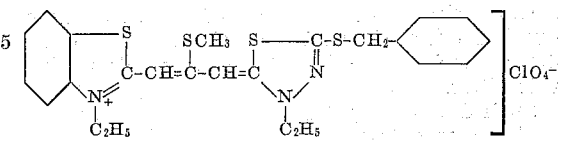

is obtained as follows:

1.8 gr. of 2-(β-methyl-β-methylmercaptovinyl)-benzthiazole-ethylmethylsulphate and 2.4 gr. of 2,5-dibenzylmercapto-1,3,4-thiodiazolediethyl sulphate are refluxed for 10 minutes in 20 cc. of alcohol with 0.5 cc. of triethylamine. After cooling, the dyestuff is precipitated with ether, and after sucking off, the precipitate is dissolved in a minimum quantity of alcohol and again precipitated with a solution of sodium perchlorate. The dyestuff is purified by recrystallization from alcohol.

The dyestuff sensitizes a silver bromoiodide emulsion to 630 m$\mu$ with a maximum at 610 m$\mu$.

*Example 8*

The dyestuff corresponding to the formula:

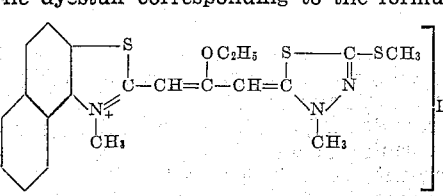

is obtained as follows:

2.0 gr. of 2-(β-methyl-β-ethoxyvinyl)-α-naphthothiazolemethylethyl sulphate and 1.6 gr. of 2,5-dimethylmercapto - 1,3,4 - thiodiazolemethyl iodide are refluxed for 5 minutes in 40 cc. of alcohol with 0.7 cc. of triethylamine. After cooling and precipitating with ether, the product is recrystallized from alcohol.

This dyestuff sensitizes very strongly a silver bromoiodide emulsion to 580 m$\mu$ with a maximum at 525 m$\mu$.

*Example 9*

The dyestuff corresponding to the formula:

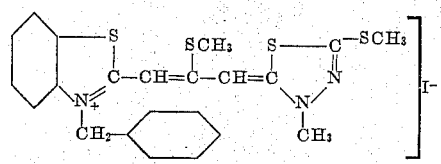

is obtained as follows:

1.1 gr. of 2-(β-methylmercapto-β-methylvinyl)-benzthiazolebenzylmethyl sulphate and 0.8 gr. of 2,5-dimethylmercapto-1,3,4-thiodiazolemethyl iodide are refluxed for 10 minutes in 25 cc. of alcohol with 0.5 cc. of triethylamine. After precipitation with ether, the dyestuff is recrystallized from alcohol.

This dyestuff sensitizes a silver bromoiodide emulsion to 630 m$\mu$ with a maximum at 610 m$\mu$.

It is to be understood that our invention is susceptible of many modifications within the scope thereof, and therefore it is not to be limited except by the terms of the appended claim.

We claim:

A photographic silver halide emulsion comprising a dyestuff which corresponds to the formula:

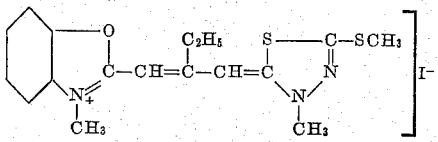

POLYDOOR FRANS DE SMET.
ANDRÉ EMILE VAN DORMAEL.

REFERENCES CITED

The following references are of record in the file of this patent:

UNITED STATES PATENTS

| Number | Name | Date |
|---|---|---|
| 2,068,047 | Zeh et al. | Jan. 19, 1937 |
| 2,096,842 | Brunken | Oct. 26, 1937 |

FOREIGN PATENTS

| Number | Country | Date |
|---|---|---|
| 457,450 | Great Britain | Nov. 24, 1936 |
| 459,162 | Belgium | Aug. 31, 1945 |